US009154851B2

(12) United States Patent
Bowler et al.

(10) Patent No.: US 9,154,851 B2
(45) Date of Patent: Oct. 6, 2015

(54) TUNABLE RF RETURN PATH FILTER WITH AUTOMATIC CHANNEL PLAN DETECTION

(75) Inventors: David B. Bowler, Acton, MA (US); John Holobinko, Avon, CT (US)

(73) Assignee: ARRIS Technology, Inc., Suwanee, GA (US)

( * ) Notice: Subject to any disclaimer, the term of this patent is extended or adjusted under 35 U.S.C. 154(b) by 160 days.

(21) Appl. No.: 13/293,541

(22) Filed: Nov. 10, 2011

(65) Prior Publication Data
US 2013/0125182 A1  May 16, 2013

(51) Int. Cl.
| | |
|---|---|
| *H04N 7/173* | (2011.01) |
| *H04N 21/61* | (2011.01) |
| *H04H 60/43* | (2008.01) |
| *H04H 60/97* | (2008.01) |
| *H04L 27/00* | (2006.01) |
| *H04N 7/10* | (2006.01) |
| *H04N 21/437* | (2011.01) |
| *H04N 21/442* | (2011.01) |
| *H04L 12/28* | (2006.01) |
| *H04N 21/24* | (2011.01) |

(52) U.S. Cl.
CPC .......... *H04N 21/6168* (2013.01); *H04H 60/43* (2013.01); *H04H 60/97* (2013.01); *H04L 27/0006* (2013.01); *H04N 7/104* (2013.01); *H04N 21/437* (2013.01); *H04N 21/44245* (2013.01); *H04L 12/2801* (2013.01); *H04N 7/173* (2013.01); *H04N 21/2408* (2013.01)

(58) Field of Classification Search
CPC .................... H04N 21/44245; H04N 21/2408; H04N 7/173; H04L 12/2801
See application file for complete search history.

(56) References Cited

U.S. PATENT DOCUMENTS

| | | |
|---|---|---|
| 5,745,838 A | 4/1998 | Tresness et al. |
| 5,999,796 A | 12/1999 | Tresness et al. |
| 6,418,558 B1 | 7/2002 | Roberts et al. |
| 6,420,928 B1 | 7/2002 | Bowler et al. |
| 6,738,401 B2 | 5/2004 | Bowler et al. |
| 6,775,840 B1 | 8/2004 | Naegel et al. |
| 6,963,696 B1 | 11/2005 | Bowler et al. |

(Continued)

FOREIGN PATENT DOCUMENTS

WO   2007/046876 A1   4/2007

OTHER PUBLICATIONS

PCT Search Report & Written Opinion, Re: Application #PCT/US2012/063553, Feb. 15, 2013.

(Continued)

*Primary Examiner* — Nathan Flynn
*Assistant Examiner* — James R Marandi
(74) *Attorney, Agent, or Firm* — Stewart M. Wiener

(57) ABSTRACT

A method and computing device that provides a tunable RF filter for a two-way communication system. The method receives a downstream video signal, and filters the downstream video signal into at least one downstream bandwidth band, each downstream bandwidth band related to desired upstream/downstream bandwidth splits. The method performs an energy detection on each downstream bandwidth band, and determines a lowest frequency of said at least one downstream bandwidth band that contains downstream video content. The method sets a diplex filter upstream/downstream frequency cutoff to a maximum upstream bandwidth that does not conflict with the lowest frequency of said at least one downstream bandwidth band that contains downstream video content.

13 Claims, 3 Drawing Sheets

(56) References Cited

U.S. PATENT DOCUMENTS

| | | |
|---|---|---|
| 7,031,357 B2 | 4/2006 | Bowler et al. |
| 7,116,954 B2 | 10/2006 | Toncich |
| 7,295,518 B1 | 11/2007 | Monk et al. |
| 7,788,050 B2 | 8/2010 | Williams |
| 7,825,743 B2 | 11/2010 | Tsuzuki et al. |
| 7,825,745 B1 | 11/2010 | Gavin et al. |
| 7,930,725 B2 | 4/2011 | Johnson et al. |
| 2002/0027688 A1 | 3/2002 | Stephenson |
| 2003/0072339 A1 | 4/2003 | Bowler et al. |
| 2004/0048574 A1* | 3/2004 | Walker et al. ............... 455/63.1 |
| 2004/0095976 A1 | 5/2004 | Bowler et al. |
| 2007/0019956 A1 | 1/2007 | Sorin et al. |
| 2008/0181613 A1 | 7/2008 | Bouda |
| 2009/0103922 A1 | 4/2009 | Lee et al. |
| 2009/0110398 A1 | 4/2009 | Pfeiffer |
| 2009/0133095 A1 | 5/2009 | Phillips et al. |
| 2009/0274471 A1 | 11/2009 | Bowler et al. |
| 2009/0310961 A1 | 12/2009 | Bowler et al. |
| 2009/0315626 A1 | 12/2009 | Bowler et al. |
| 2010/0098412 A1 | 4/2010 | Boyd et al. |
| 2010/0111532 A1 | 5/2010 | Chen et al. |
| 2010/0251320 A1 | 9/2010 | Shafer et al. |
| 2012/0148245 A1 | 6/2012 | Bowler et al. |

OTHER PUBLICATIONS

PCT Search Report & Written Opinion, Re: Application #PCT/US2011/064039; Mar. 6, 2012.

Broadcom Corporation, "TK3401—Multirate 1 or 2 Gbps EPON Intelligent PON Node (IPN) Controller", available at www.broadcom.com/products/Switching/EPON-Solutions/TK3401, retrieved Dec. 6, 2011.

E. Trojer, et al., "Current and next-generation PONs: A technical overview of present and future PON technology", Ericsson Review, No. 2, pp. 64-69, 2008.

ITU-T, "Recommendation ITU-T G.984.6", "Gigabit-capable passive optical networks (GPON): Reach extension", Rec. ITU-T G.984.6 (Mar. 2008).

ITU-T, "Recommendation ITU-T G.984.6 Amendment 1", "Gigabit-capable passive optical networks (GPON): Reach extension—Amendment 1: Wavelength-converting, continuous mode, and 1:N-protected range extenders", Rec. ITU-T G.984.6 (2008)/Amd.1 (Nov. 2009).

Alphion Corporation, "Product Brief: PON.ext™—PON Reach Extension System", 2010.

R.P. Davey, et al., "Long-Reach Passive Optical Networks", Journal of Lightwave Technology, vol. 27, No. 3, pp. 273-291, Feb. 2009.

J. Thoguluva, et al., "Frame-level OEO-Regenerating GPON Reach Extender", Optical Society of America, Optical Fiber Communication Conference and Exposition, National Fiber Optic Engineers Conference (OSA/OFC/NFOEC), 2011.

* cited by examiner

TUNABLE RF RETURN PATH FILTER WITH AUTOMATIC CHANNEL PLAN DETECTION

BACKGROUND

A hybrid fiber-coaxial (HFC) network is a broadband network that combines optical fiber and coaxial cable. The HFC network typically provides two-way communication between a cable operator's headend facility and a subscriber's location. The headend facility collects and processes communication signals, and distributes the signals to the subscriber's location using a downstream communication path. A set-top box or cable modem at the subscriber's location receives the communication signals on the downstream communication path, and transmits other communication signals to the headend facility using an upstream communication path.

The upstream communication signals allow the cable operators to offer advanced communication services to the subscribers. These advanced communication services include pay-per-view programming, video-on-demand services, telephony, interactive digital networks, and computer data services. The transmission of the upstream communication signals are in a frequency band that is either higher or lower than the downstream communication signals to avoid interference between the upstream and downstream communication signals. As these advanced communication services become more popular, the need for additional bandwidth on the upstream communication path is increasing.

The only way the cable operator can increase the bandwidth on the upstream communication path today is to send a technician to an amplifier site on the HFC line, or telephone pole, and replace the analog filter sub-assemblies in the amplifier. The cable operator needs a way to build an HFC plant today that will allow them to upgrade the bandwidth of the upstream channels in the future without the need to send a technician to replace previously installed equipment.

There is a need for a method of detecting the allocation of the downstream communication path to determine the correct bandwidth of the upstream communication path. The presently disclosed invention satisfies this demand.

SUMMARY

Aspects of the present invention provide a method and computing device that provides a tunable RF filter for a two-way communication system. The method receives a downstream video signal, and filters the downstream video signal into at least one downstream bandwidth band, each downstream bandwidth band related to desired upstream/downstream bandwidth splits. The method performs an energy detection on each downstream bandwidth band, and determines a lowest frequency of said at least one downstream bandwidth band that contains downstream video content. The method sets a diplex filter upstream/downstream frequency cutoff to a maximum upstream bandwidth that does not conflict with the lowest frequency of said at least one downstream bandwidth band that contains downstream video content.

DETAILED DESCRIPTION

Figure 1:
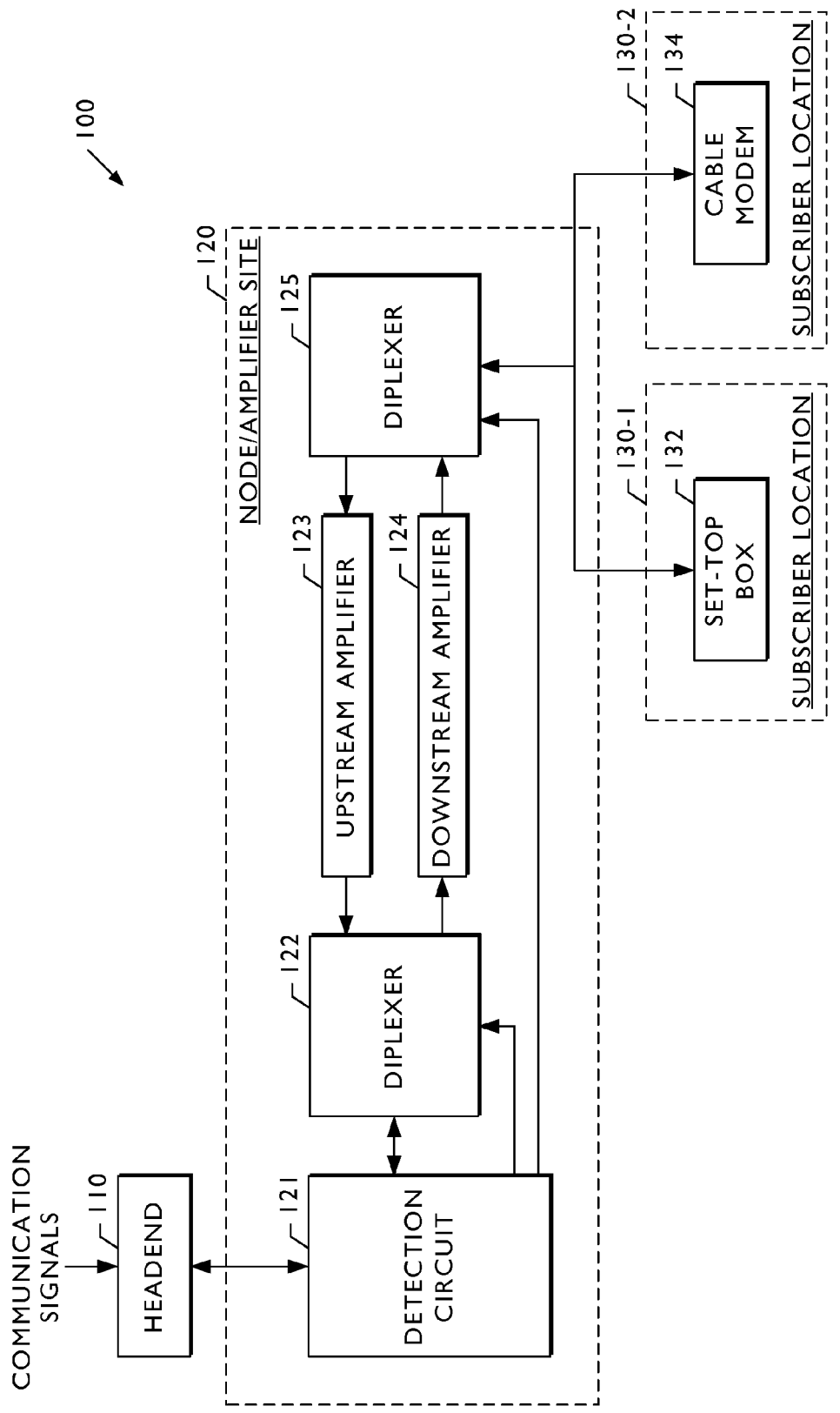
FIG. 1 is a block diagram that illustrates one embodiment of the hardware components of a system that performs the present invention.

FIG. 1 is a block diagram that illustrates one embodiment of the hardware components of a system that performs the present invention. A hybrid fiber-coaxial (HFC) network 100 is a two-way broadband network that includes a headend 110, node/amplifier site 120, and subscriber location 130. In another embodiment, the HFC network 100 may include any number of headend 110 and node/amplifier site 120 components to provide load balancing and redundancy to support two-way communication with any number of subscriber locations 130.

As shown in FIG. 1, the headend 110 receives communication signals from an external source, and distributes those communication signals, via the node/amplifier site 120, to the subscriber location 130 using downstream channels. The subscriber location 130 includes a device, such as a set-top box 132 or cable modem 134, to receive radio frequency (RF) communication signals on the downstream channels, and transmit other communication signals on the upstream channels. The other communication signals utilize the upstream channels and allow the subscriber to take advantage of advanced communication services from the cable operator. The node/amplifier site 120 includes a detection circuit 121, first diplexer 122, upstream amplifier 123, downstream amplifier 124, and second diplexer 125. The upstream amplifier 123 boosts the signal levels for the upstream channels, and the downstream amplifier 124 boosts the signal levels for the downstream channels to overcome the loss imposed by the coaxial cables, and splitters and combiners. The detection circuit 121 performs the disclosed method of the present invention.

Figure 2:
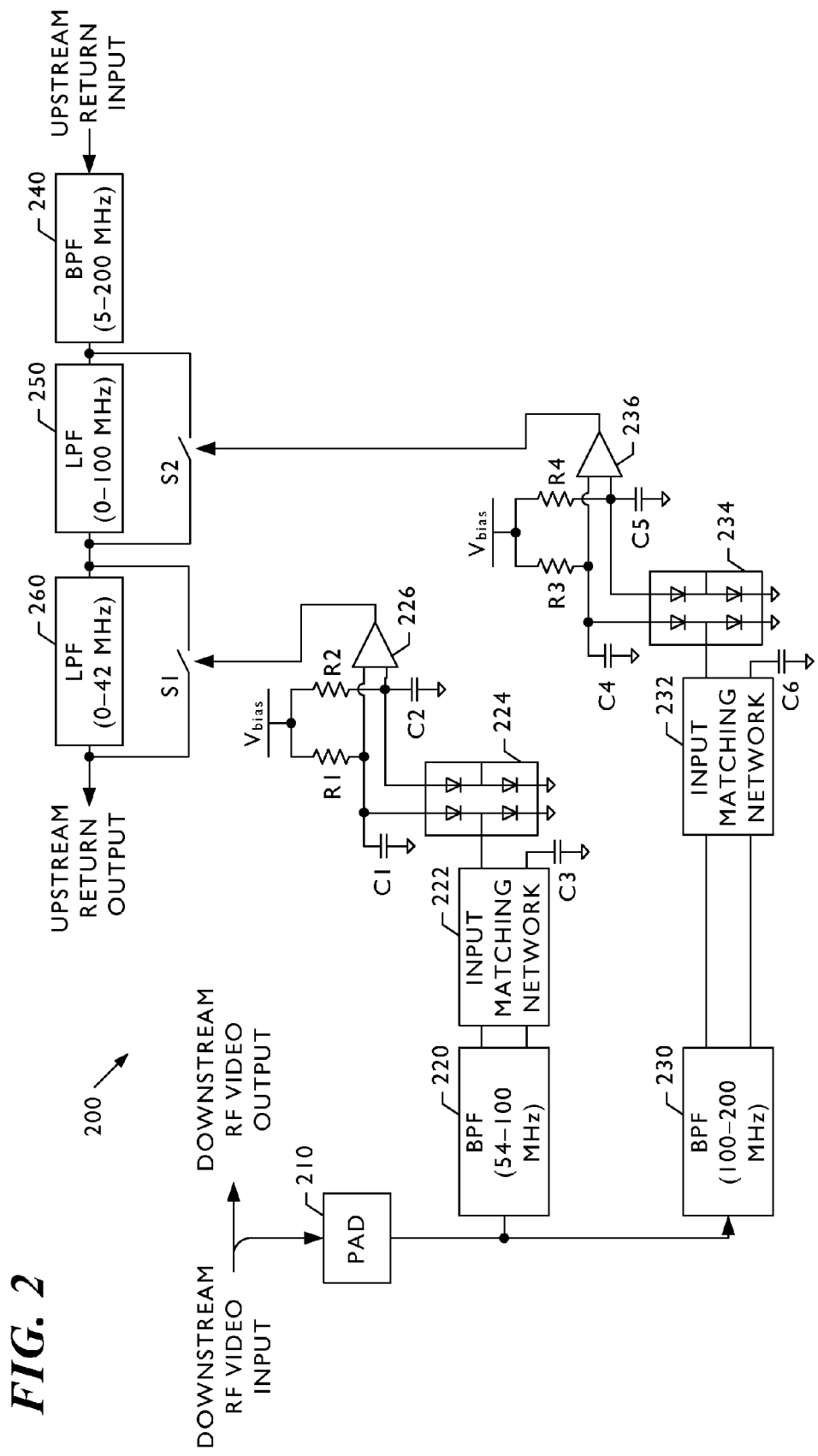
FIG. 2 is a schematic diagram that illustrates a tunable RF return path filter according to one embodiment of the present invention.

FIG. 2 is a schematic diagram that illustrates a tunable RF return path filter according to one embodiment of the present invention. The tunable RF return path filter, shown in FIG. 2, illustrates one embodiment of the implementation of the detection circuit 121 shown in FIG. 1.

The circuit 200 shown in FIG. 2 includes a downstream RF video input for receiving downstream RF video from the headend 110. The circuit 200 functions as a pass-thru device for the downstream communication path by sending the downstream RF video to the set-top box 132, or cable modem 134, via a downstream RF video output.

The circuit 200 includes a directional tap of the downstream communication path to create a downstream RF video signal for the circuit 200. This downstream RF video signal is input to an RF attenuator pad 210 to lower the amplitude of the signal for a series of band pass filters (BPFs) and RF energy detectors. The RF energy detectors monitor the low-frequency bands of the downstream RF video signal, and control switches that bypass or enable the filtering of the upstream RF communication signal at available upstream bandwidth ranges. This allows the circuit 200 to adjust the upstream bandwidth to have a high-frequency roll-off that is slightly less than the lowest frequency in use on the downstream RF video signal. In various embodiments, the RF attenuator pad 210 connects to any number of BPFs and RF energy detectors, where the number of BPFs depends upon the granularity of the RF energy detectors desired by the cable operator.

As shown in FIG. 2, the first BPF 220 filters the RF video signal in a desired range (e.g., 54-100 MHz), and the second BPF 230 filters the RF video signal in another desired range (e.g., 100-200 MHz). The first BPF 220 connects to an RF energy detector circuit that includes an input matching network 222, matched Schottky diodes 224, capacitors C1, C2, C3, resistors R1, R2, and a differential amplifier 226, where the output of the differential amplifier 226 connects to a switch S1. When the first BPF 220 detects RF energy in the desired range, the switch S1 is closed, otherwise the switch S1 is open. The second BPF 230 connects to an RF energy detector circuit that includes an input matching network 232, matched Schottky diodes 234, capacitors C4, C5, C6, resistors R3, R4, and a differential amplifier 236, where the output of the differential amplifier 236 connects to a switch S2. When the second BPF 230 detects RF energy in the other desired range, the switch S2 is closed, otherwise the switch S2 is open. In various other embodiments, the RF energy detector circuit includes an expensive integrated circuit solution, and a low-cost matched Schottky diode solution that feeds to a comparator.

The circuit 200 also includes an upstream return input for receiving upstream RF communication signal from the set-top box 132, or cable modem 134. The upstream RF communication signal is an input to a BPF 240, and a series of switched low-pass filters (LPFs). The BPF 240 filters the upstream RF communication signal in a desired range (e.g., 5-200 MHz). A switch S2 controls whether the upstream RF communication signal bypasses or enables a first low-pass filter (LPF) 250 that further filters the upstream RF communication signal to a desired sub-range (e.g., 0-100 MHz). The switch S2, and whether the upstream RF communication signal bypasses or enables the first LPF 250, is controlled by the output of the differential amplifier 236 of one of the RF energy detector circuits that filters the downstream RF video signal. A switch S1 controls whether the upstream RF communication signal bypasses a second LPF 260 that further filters the upstream RF communication signal to a desired sub-range (e.g., 0-42 MHz). The switch S1, and whether the upstream RF communication signal bypasses or enables the second LPF 260, is controlled by the output of the differential amplifier 226 of one of the RF energy detector circuits that filters the downstream RF video signal. Each LPF 250, 260 defines an available upstream bandwidth range, and the switches S1, S2 allow the circuit 200 to either bypass or enable the first LPF 250 or second LPF 260, thereby adjusting the overall bandwidth on the upstream RF communication signal.

Figure 3:
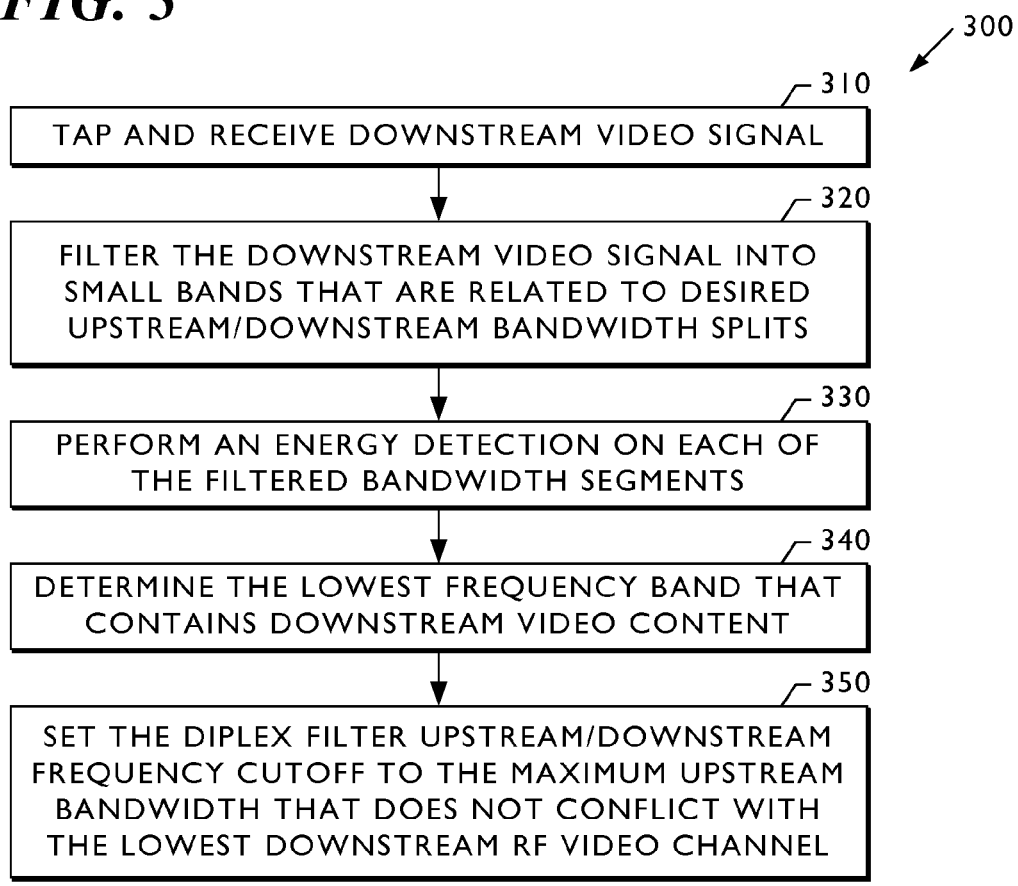
FIG. 3 is a flow diagram that illustrates a method of adjusting the bandwidth of the upstream communication in an HFC plant according to one embodiment of the present invention.

FIG. 3 is a flow diagram that illustrates a method of adjusting the bandwidth of the upstream communication in an HFC plant according to one embodiment of the present invention. The process 300 shown in FIG. 3 begins when the circuit 200 taps and receives a downstream video signal (step 310) that is processed by a number of filters into small bands that are related to desired upstream/downstream bandwidth segments (step 320). Each filter receives the downstream video signal as an input and produces one of the bandwidth segments as an output. The process 300 performs an energy detection on each of the filtered bandwidth segments (step 330) and determines the lowest frequency band that contains downstream video content (step 340). The process 300 sets the diplex filter upstream/downstream frequency cutoff to the maximum upstream bandwidth that does not conflict with the lowest downstream RF video channel (step 350).

Although the disclosed embodiments describe a fully functioning method and computing device that provides a tunable RF filter for a two-way communication system, the reader should understand that other equivalent embodiments exist. Since numerous modifications and variations will occur to those reviewing this disclosure, the method and computing device that provides a tunable RF filter for a two-way communication system is not limited to the exact construction and operation illustrated and disclosed. Accordingly, this disclosure intends all suitable modifications and equivalents to fall within the scope of the claims.

We claim:
1. A method, comprising:
in a detection circuit, receiving an attenuated downstream communication signal for controlling a plurality of switches;
using a plurality of bandpass filters to filter the attenuated downstream communication signal into a plurality of downstream bandwidth bands, each downstream bandwidth band related to a corresponding one of the plurality of switches and a corresponding available upstream/downstream bandwidth split;
performing an energy detection on each downstream bandwidth band for determining whether a frequency of said downstream bandwidth band contains downstream communication content; and
based on a result of the determining on each downstream bandwidth band, controlling the corresponding one of the plurality of switches to one of bypassing and enabling a corresponding low-pass filter of a diplex filter, such that the diplex filter is thereby configured to receive an upstream communication signal and to output a filtered upstream communication signal having a maximum upstream bandwidth that does not conflict with a lowest downstream frequency of said plurality of downstream bandwidth bands that contains downstream communication content.

2. The method of claim 1, wherein the receiving of the attenuated downstream communication signal further comprises:
obtaining a first downstream communication signal from a first output of a directional tap that receives the first downstream communication signal from a signal source,
the directional tap having a second output for passing the first downstream communication signal through to a downstream device.

3. The method of claim 1, wherein each downstream bandwidth band is a low frequency band of the downstream communication signal.

4. The method of claim 1, wherein each available upstream/downstream bandwidth split corresponds to at least one of said plurality of downstream bandwidth bands such that when the result of the determining is an indication of downstream communication content on the at least one corresponding downstream bandwidth band, a corresponding at least one low-pass filter of the diplex filter is enabled for adjusting the diplex filter to output the filtered upstream communication signal according to said upstream/downstream bandwidth split.

5. The method of claim 1, wherein each available upstream/downstream bandwidth split corresponds to a unique one of said plurality of downstream bandwidth bands such that when the result of the determining is an indication of downstream communication content on the unique one corresponding downstream bandwidth band, a corresponding unique one low-pass filter of the diplex filter is enabled for adjusting the diplex filter to output the filtered upstream communication signal according to said upstream/downstream bandwidth split.

6. The method of claim 1, wherein the energy detection on each downstream bandwidth band includes providing each downstream bandwidth band as an input to at least one of an integrated circuit, and a matched Schottky diode solution that feeds to a comparator.

7. A node device, comprising:
   one or more diplexers resident in the node device; and
   a detection circuit disposed in communication with the a plurality of switches, the detection circuit configured to:
      in the detection circuit, receive an attenuated downstream communication signal for controlling the plurality of switches;
      using a plurality of bandpass filters to filter the attenuated downstream communication signal into a plurality of downstream bandwidth bands, each downstream bandwidth band related to a corresponding one of the plurality of switches and a corresponding upstream/downstream bandwidth split;
      perform an energy detection on each downstream bandwidth band to determine whether a frequency of said downstream bandwidth band contains downstream communication content; and
      based on a result of the determining on each downstream bandwidth band, control the corresponding one of the plurality of switches to one of bypassing and enabling a corresponding low-pass filter of a diplex filter, such that the diplex filter is thereby configured to receive an upstream communication signal and to output a filtered upstream communication signal having a maximum upstream bandwidth that does not conflict with a lowest downstream frequency of said plurality of downstream bandwidth bands that contains downstream communication content.

8. The node device of claim 7, wherein to receive the attenuated downstream communication signal, the detection circuit is further configured to:
   obtain a first downstream communication signal from a first output of a directional tap that receives the first downstream communication signal from a signal source,
   the directional tap having a second output configured to pass the first downstream communication signal through to a downstream device.

9. The node device of claim 7, wherein each downstream bandwidth band is a low frequency band of the downstream communication signal.

10. The node device of claim 7, wherein each upstream/downstream bandwidth split corresponds to at least one of said plurality of downstream bandwidth bands such that when the result of the determining is an indication of downstream communication content on the at least one corresponding downstream bandwidth band, a corresponding at least one low-pass filter of the diplex filter is enabled for adjusting the diplex filter to output the filtered upstream communication signal according to said upstream/downstream bandwidth split.

11. The node device of claim 7, wherein each upstream/downstream bandwidth split corresponds to a unique one of said plurality of downstream bandwidth bands such that when the result of the determining is an indication of downstream communication content on the unique one corresponding downstream bandwidth band, a corresponding unique one low-pass filter of the diplex filter is enabled for adjusting the diplex filter to output the filtered upstream communication signal according to said upstream/downstream bandwidth split.

12. The node device of claim 7, wherein the energy detection on each downstream bandwidth band includes providing each downstream bandwidth band as an input to at least one of an integrated circuit, and a matched Schottky diode solution that feeds to a comparator.

13. A node/amplifier apparatus for tunable return path filtering, the node/amplifier apparatus comprising:
   one of a node device and an amplifier device, configured to be deployed in a hybrid fiber-coaxial (HFC) network in a site between a headend and one or more subscriber devices;
   a downstream input configured for receiving a downstream communication signal from the headend;
   a downstream output communicatively coupled to the downstream input, the downstream output configured for sending the downstream communication signal to the one or more subscriber devices;
   an upstream input, configured for receiving an upstream communication signal from the one or more subscriber devices;
   one or more diplexers, communicatively coupled to the upstream input and to an upstream output for sending a filtered upstream communication signal to the headend;
   a detection circuit, communicatively coupled to the downstream input and disposed in communication with a plurality of switches, the detection circuit configured for:
   receiving an attenuated downstream communication signal for controlling the plurality of switches;
   using a plurality of bandpass filters to filter the attenuated downstream communication signal into a plurality of downstream bandwidth bands, each downstream bandwidth band related to a corresponding one of the plurality of switches and a corresponding available upstream/downstream bandwidth split;
   performing an energy detection on each downstream bandwidth band for determining whether a frequency of said downstream bandwidth band contains downstream communication content; and
   based on a result of the determining on each downstream bandwidth band, controlling the corresponding one of the plurality of switches to one of bypassing and enabling a corresponding low-pass filter of the one or more diplexers, such that the one or more diplexers are thereby configured for providing the filtered upstream communication signal to the upstream output, the filtered upstream communication signal having a maximum upstream bandwidth that does not conflict with a lowest downstream frequency of said plurality of downstream bandwidth bands that contains downstream communication content.

* * * * *